United States Patent [19]

Swensrud et al.

[11] Patent Number: 4,659,902
[45] Date of Patent: Apr. 21, 1987

[54] ROBOT LASER SYSTEM

[75] Inventors: Roger L. Swensrud, Plum Boro; Mark D. White, South Park Twp.; Michael J. Janosik, Pittsburgh; Daniel P. Soroka, Imperial; Joseph J. Zelezniak, Upper St. Clair Twp., all of Pa.

[73] Assignee: Westinghouse Electric Corp., Pittsburgh, Pa.

[21] Appl. No.: 725,451

[22] Filed: Apr. 22, 1985

[51] Int. Cl.⁴ ............................................. B23K 26/02
[52] U.S. Cl. ...................... 219/121 LU; 219/121 LV; 219/121 LQ; 219/121 FS
[58] Field of Search ................ 219/121 LU, 121 LV, 219/121 L, 121 LM, 121 LC, 121 LD, 121 LH, 121 LJ, 121 FS, 121 LQ

[56] References Cited

U.S. PATENT DOCUMENTS

| | | | |
|---|---|---|---|
| 4,088,865 | 5/1978 | Peters et al. | 219/121 LC |
| 4,319,120 | 3/1982 | LaRocca | 219/121 FS |
| 4,492,843 | 1/1985 | Miller et al. | 219/121 LD X |

FOREIGN PATENT DOCUMENTS

0157221 10/1985 European Pat. Off. ...... 219/121 FS

*Primary Examiner*—C. L. Albritton
*Attorney, Agent, or Firm*—Thomas R. Trempus

[57] ABSTRACT

A robot laser work cell combines a plurality of systems which include an orthogonal axis manipulator system, a laser beam delivery system, a safety enclosure system, a coolant chiller for the laser beam delivery system, an air filtration and drying system in communication with the laser beam delivery system, an exhaust system for removing toxic fumes from the area proximate the output of the laser beam delivery system and a variety of precision table and other fixturing means which can be used in combination to function as the work cell of this invention. In an alternative embodiment, a laser package is mounted by a modular wrist onto the Z-axis of the orthogonal axis manipulator and the laser beam delivery system.

19 Claims, 5 Drawing Figures

ROBOT LASER SYSTEM

FIELD OF THE INVENTION:

This invention relates to automated manufacturing apparatus and systems which use such apparatus. More particularly, this invention is directed to an integrated, laser-robotic, work cell which includes peripheral equipment necessary to form a functional system.

BACKGROUND OF THE INVENTION

The general acceptance of industry automation as an essential requirement for improving productivity has increased the acceptance level of the robot or manipulator apparatus as a mechanism for achieving automated industrial applications. The acceptance of robots as a useful, industrial "tool" has resulted in a market demand for a robot system exhibiting the simplified design considerations of a machine tool suitable for control by conventional computer numerical control, direct numerical control and off-line programming with language such as an Automatic Programmed Tool (APT).

High powered lasers are ideally suited to be used as a source of heat in various material processing applications which include the vaporization of materials, drilling and cutting operations. Lasers are also applicable to procedures, such as welding or surface cladding of materials, that is to say processes and procedures which require the melting of materials. Also, the temperature of solid phase materials can be varied by the use of the laser in hardening and annealing operations.

The thermal affects which are experienced by materials when exposed to the laser beam are primarily dependent on the intensity of laser energy, the absorptivity of the material, and the length of time during which the material is exposed to the laser beam. Precise control over these parameters determines the resulting change in the phase or the state of the material. Usually, when lasers are used in processes such as welding, cutting and surface treatment, the area of the workpiece to be processed is oriented in such a way that it is nearly normal to the laser beam with the beam impinging squarely on its surface. This configuration optimizes the absorptivity of the material and facilitates its heating. Generally, the laser and the workpiece are caused to move relative to each other. This relative motion can be accomplished in two ways. First, the beam can be traversed over a stationary workpiece. Second, the workpiece can be manipulated under a fixed laser beam. Typically, the former method requires that the laser beam be moved either by mounting the laser on a movable device or by directing the beam from a fixed laser to the workpiece by use of a movable optical system.

A dedicated effort has been directed to the optimization of the use of industrial manipulators and high powered lasers to provide an integrated laser robot system. U.S. patent application Ser. No. 485,076 entitled General Purpose Orthogonal Axes Manipulator System by Daniel P. Soroka et al., which is assigned to the assignee of the present invention, discloses an overhead gantry style robot with a large rectangular working envelope. This robot permits programming in Cartesian coordinates as contrasted with the more complicated polar coordinates. This gantry robot design provides a rigid manipulator that supports machine tool-type interpolation moves, high accuracy and repeatability while permitting robotic-type velocity and dexterity. The gantry design provides for an overhead X axis assembly supported by vertical structural members. The Y axis assembly extends as an arm from the X axis assembly and further supports a vertical Z axis assembly. In addition to the orthogonal X, Y and Z axes assemblies, a mounting surface on the Z axis assembly is designed to accommodate a multiple axis rotary wrist to which an appropriate end effector can be attached. This end effector can be a gripper, welding torch, or as will be described herein, a YAG laser or the delivery point of a laser delivery system.

Allowed U.S. patent application Ser. No. 460,346 which is entitled Robotic Laser Beam Delivery Apparatus by Daniel J. Plankenhorn which application is assigned to the assignee of the present invention, discloses a light beam directing apparatus which permits a reflected beam of light, such as a laser, to be directed in a path which comprises a plurality of straight segments. Each segment of the beam is associated with a segment of a robots axis in a fixed spatial relationship. The aforedescribed patent applications describe only a portion of a total system that is utilized according to this invention to provide a complete work cell. The present invention describes several important items which when used in combination with the gantry-type robot and laser beam delivery system provides a complete work cell.

It is, therefore, an object of this invention to provide a robot-laser system which allows for a new methodology which can overcome many of the productivity-limiting problems of present techniques by means of the flexibility, versatility and adaptability of the robot-laser system of this invention.

It is another object of this invention to provide a robot-laser system in a work cell configuration which includes unique safety features which enclose the working envelope of the industrial manipulator and provide a safety fence surrounding the complete system.

It is a further object of this invention to provide an air filter and dryer mechanism by which dust and condensation on the reflective surfaces of the laser delivery system are eliminated and a desired environment within the laser delivery system is established.

It is yet another object of this invention to provide an exhaust system by which toxic fumes emitted during the laser cutting and cladding process are removed from the work area.

It is still another object of this invention to provide an extensive range of process dependent peripheral devices which can be located within the working envelope of the industrial manipulator.

SUMMARY OF THE INVENTION

The invention provides a robot laser work cell which includes in combination several unique systems. A gantry type orthogonal axis manipulator system which includes rack and pinion mechanical drives for the X and Y axis assemblies and a ball screw mechanical drive for the Z-axis assembly and which employs closed loop DC servo electrical drives controlled by conventional numerical control techniques provides the heart of the cell. An integral laser beam delivery system for the delivery of a beam along any point within the geometric range of motion of the orthogonal axis manipulator includes optical joints with reflective members disposed therein mounted on the frame member of the mechanical joints of the manipulator system so as to be in synchronous association with these mechanical joints. A series of collapsible and expansible tubular members are disposed between adjacent optical joints and provide a path through which the beam passes as it travels from optical joint to optical joint. The tubular members are rigidly attached between the frame members of the mechanical joints with which the adjacent optical joints are in synchronous association. The reflective surfaces establish a constant geometric relation between a segment of the beam impinging on the reflective surface and the axis of motion associated with the mechanical joints. Accordingly, the optical joints along with the tubular members disposed therebetween and each axis of motion of the manipulator are synchronous and incapable of mutual interference. An air filtration and air drying system is in communication with the tubular members and optical joints of the beam delivery system for ensuring both that the optical joints and tubular members remain substantially free of dust and condensation during the system's operation and that a desired environment is maintained in the laser beam delivery system to aid in minimizing blooming of the laser beam. A safety enclosure is provided about the work cell. This enclosure serves a multiplicity of purposes. It allows the operator to view the system operation with decreased risk of harm and serves as an early warning line of defense both against unauthorized personnel entering the work envelope and the presence of a stray laser beam within the work envelope. For example, when using a 10.6 micron $CO_2$ laser, a plexiglass safety enclosure will emit smoke prior to burn through and serve to warn individuals proximate the work cell of a present danger. A coolant chiller is provided and is in communication with the optical joints in order to maintain the temperature of the reflective optical joints within predetermined parameters. An exhaust system with ducting means disposed proximate the end of the Z-axis or tooling disposed thereon provides a means whereby toxic fumes generated by metal working processes can be withdrawn from the work area. A variety of precision tables and other fixturing can also be provided in combination with the work cell of this invention to enhance the flexibility thereof.

In an alternative embodiment of this invention, a robot manipulator as described above can be used in combination with a laser package such as a YAG laser, wave guide laser, bar code reader, etc. Such a combination within the work cell would of course eliminate the need for the laser beam delivery system and its attendant systems. However, the safety enclosure system as well as the tooling and precision tables and fixtures can remain an integral portion of the work cell according to this alternative embodiment.

BRIEF DESCRIPTION OF THE DRAWINGS

The above as well as other features and advantages of the present invention will become apparent through consideration of the detailed description in conjunction with the accompanying drawings, in which.

DETAILED DESCRIPTION OF THE INVENTION

Figure 1:
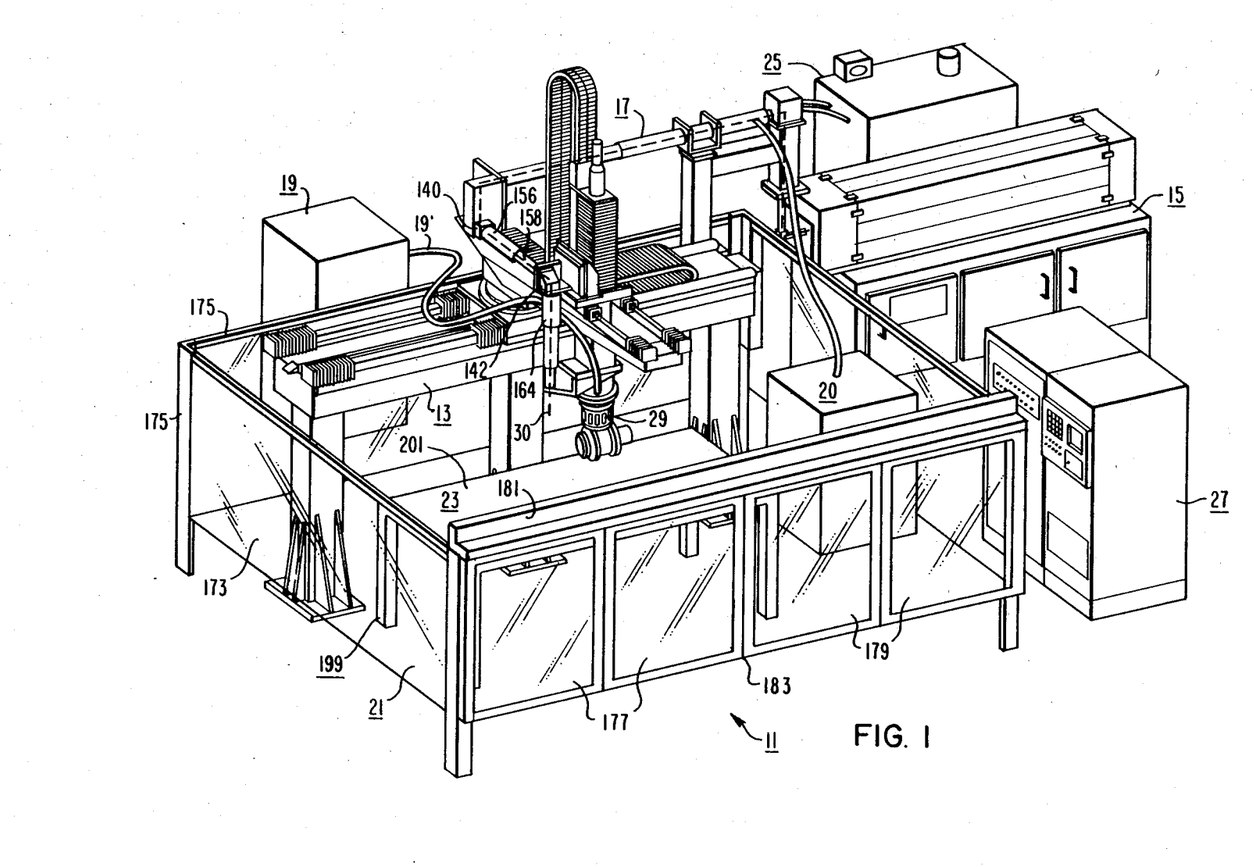
FIG. 1 is an isometric view of an orthogonal axis manipulator system incorporating a laser beam delivery system and the several unique systems combined therewith to form a robot-laser work cell.

A complete, integrated robot-laser work cell system according to the teachings of this invention is isometrically presented in FIG. 1 and generally indicated by the reference character 11. The robot-laser system 11 includes an orthogonal axis manipulator system 13 to which is coupled a laser system 15 by means of a laser beam delivery system 17. This system 11 also includes an exhaust system at 19, a safety enclosure means 21 and a precision table or other fixture as at 23. A coolant chiller for the optics used in the laser beam delivery system 17 is indicated at 25 and the programmable controller by which the orthogonal axis manipulator is directed is indicated at 27. It should be appreciated that the end of arm tooling or end effector utilized in combination with the laser beam delivery system 17 and the orthogonal axis manipulator 13 is an application dependent variable. Accordingly, the desired work to be effected by the laser-robot system of this invention will dictate the specific tooling to be utilized with the robot as well as the type of wrist selected which depends in part, upon the number of degrees of freedom desired within the work envelope.

In order to more fully appreciate the various systems used in combination to provide the work cell of this invention, each of the systems as described above in connection with FIG. 1 will be individually described in detail hereinafter.

Figure 2:
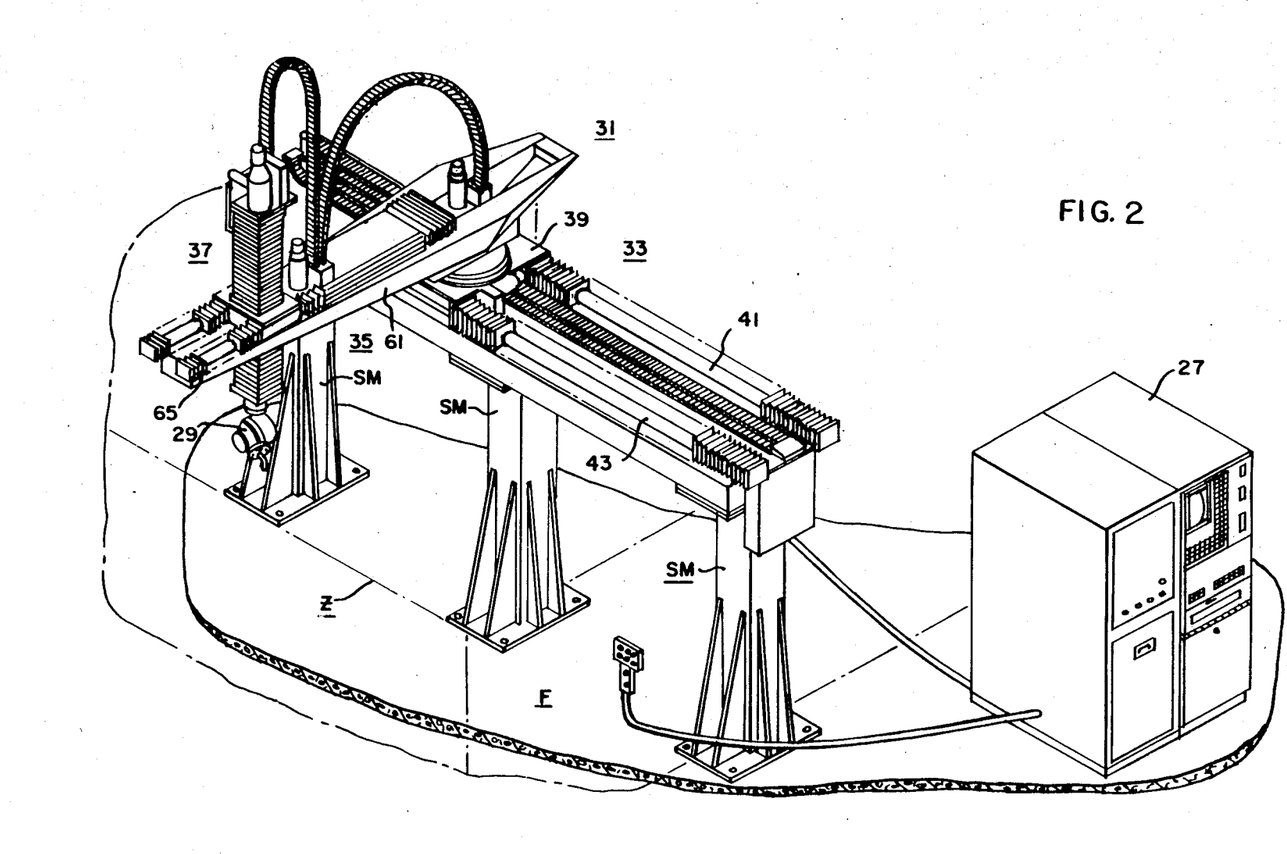
FIG. 2 is an isometric view of an orthogonal axis manipulator system which is used in the preferred embodiment of this invention.

Referring now to FIG. 2, there is illustrated a manipulator system 13 comprising three orthogonal axes assemblies consisting of the X axis assembly 33, the Y axis assembly 35, and the Z axis assembly 37. An optional multiple axis rotary wrist mechanism 29 is mechanically secured to the Z axis assembly 37 to accommodate an end effector T which as described above could typically be a gripper, a welding torch, etc., for use in combination with the laser beam delivery system 17 (of FIG. 1).

The operative combination of the X, Y and Z axes assembly is supported in a gantry-type configuration by the vertical support members SM which are secured to the floor F of the working facility. Machine tool-type control of the operation of the manipulator system 13 is implemented by a conventional numerical control console 27 such as the PRODUCER TM CNC System which is available from the Westinghouse Electric Corporation. The orthogonal axis machine tool-type configuration of the X, Y and Z axes assemblies elevated in the gantry configuration results in an optimized working envelope corresponding to the rectangular volume work zone Z. This gantry configuration of an orthogonal axis manipulator system significantly reduces the number of wrist articulations required to implement the desired work process, and further reduces requirements for auxiliary devices such as rotary tables. It however should be appreciated that the use of an auxiliary device such as the aforementioned rotary table can provide an extremely enhanced flexibility to the manufacturing capabilities provided in the work cell of this system. Pulse width modulated drive for the close loop DC servo motor arrangements of each axis assembly is provided through the use of conventional drive circuitry located in the drive cabinet portion on the robot control 27. The direct coupled DC servo motor arrangements include a motor-tachometer package and a resolver or an encoder. The tachometer provides speed feedback information to the control console CS while the resolver supplies the control console CS with position feedback information directly from the drive motor. This produces a highly stable servo response.

The X axis assembly 33 as shown in FIG. 2, consists of a closed cell type of construction which minimizes the torsional deflection of the X axis carriage 39 as it travels along the X axis guidance system, thereby providing the desired system accuracy and repeatability. The X axis guidance system, or way system, includes two, 3-inch diameter ground guide rails 41 and 43 which provide maximum rigidity and stiffness for the torsional-type bending modes. The dual rail way system which is supported by the members SM further assures a smooth low friction travel of the X axis carriage in response to the closed loop DC servo control. The X axis carriage 39 is coupled to the guide rails 41 and 43 by linear bearings which are preloaded and sealed in the housings 47 to protect the bearings from dirt. The mechanical drive for the X axis assembly is a rack and pinion mechanism consisting of a rack and pinion shaft which is direct coupled to a DC motor tachometer package.

The Y axis assembly 35, functions as an arm extending perpendicularly from the X axis assembly 33. The Y axis assembly includes a support member assembly 61 and a double rail way arrangement which minimizes the stresses and rotational deflections during the Y axis travel of the Y axis carriage as well as during the positioning of the Z axis assembly 37 within the work zone Z. The guide rails are protected by bellows covers 65.

The Z axis assembly 37 employs a ball screw mechanism consisting of a ball screw and a fixed nut in combination with a way mechanism consisting of guide rails to transport the Z axis carriage in response to the drive motor-tachometer package motor. The dual rail way mechanism functions similarly to that described above with respect to the X and Y axis. Additional unique features incorporated into the orthogonal axis manipulator described hereinabove are disclosed in U.S. patent application Ser. No. 485,076 which is assigned to the assignee of the present invention and which is incorporated herein by reference as if fully set forth.

Figure 3:
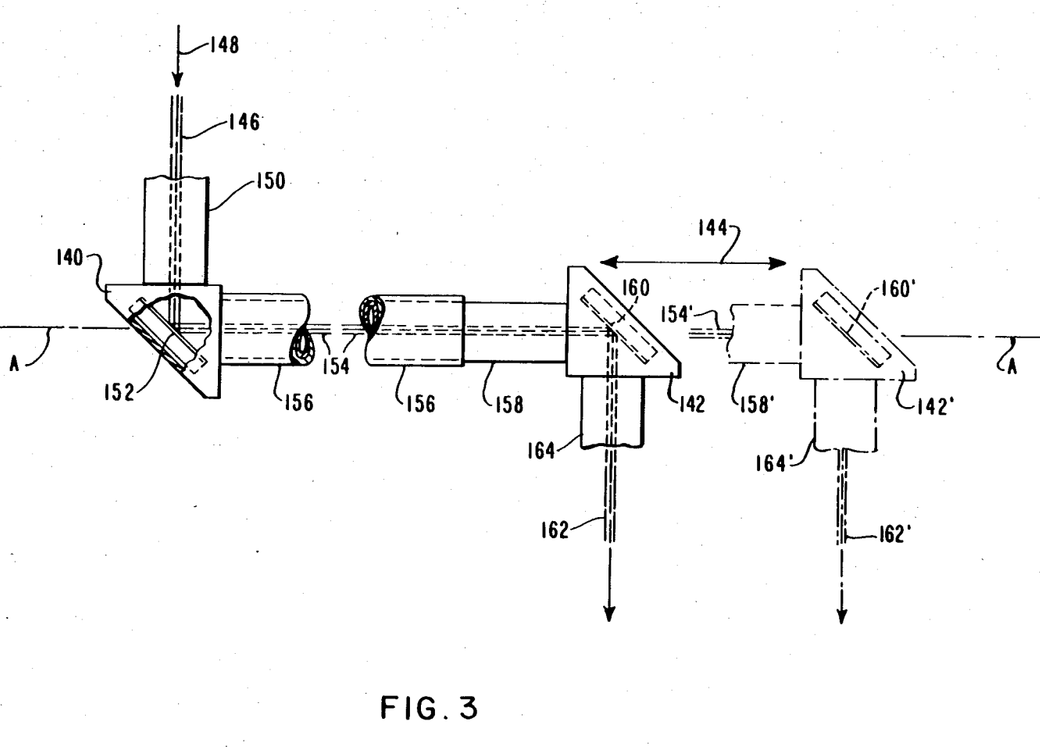
FIG. 3 illustrates an optical joint utilized in the laser beam delivery system described herein which is attached in slidable association with a support arm defining one axis of the orthogonal manipulator.

The laser beam delivery system used in this work cell in its simplest form comprises a series of joints which are attached to a support member or arm defining one axis of movement of the robotic system 13. The configuration shown in FIG. 3 illustrates an embodiment of the laser beam delivery system utilized in combination with the Series 6000 orthogonal axis manipulator 13. This configuration permits synchronous movement in conjunction with the displacement of the various arms defining the axes of the manipulator 13. As long as the incident light beam lies on the axis of motion A of the optical joint, the laser beam will be delivered and the laser beam delivery system will function properly. It should be appreciated that this axis of motion can be one of either axial or rotational movement or a combination thereof. More particularly, FIG. 4 comprises two optical joints 140 and 142, which are disposed in axially displaceable relationship with each other. Returning briefly to the systems configuration shown in FIG. 1, the optical joints 140 and 142 can be seen to direct the beam along the Y axis of the orthogonal axis manipulator 13. Assuming for purposes of discussion that joint 140 is fixed in space, joint 142 can move either toward or away from joint 140 along its axis of motion A in the direction shown by the arrow 144. In other words, joint 142 can alternatively assume the positions shown by reference numerals 142 and 142', inter alia. When a collimated incident light beam 146 passes, as shown in the direction of the arrow 148, through a tubular member 150 into the joint 140, it strikes a reflective member 152 and is reflected at an angle of 90° along the light beam 154. This light beam 154 passes through a tubular member 156, along axes of motion A, and into the joint 142. As can be seen in FIG. 3, joint 142 is rigidly attached to a tubular member 158 and tubular member 158 is associated in sliding relation with tubular member 156. As these two slidably associated members move axially with respect to each other in the direction shown by arrow 144, joint 142 moves either toward joint 140 or away from it. As long as the reflective member 160 of joint 142 is positioned at a constant angle of 45 degrees to the light beam 154, the resulting reflecting light beam 162 passes from the reflective member 160, out of the optical joint 142 and through the tubular member 164 in a direction which is at an angle of 90° to the light beam 154. Therefore, as the optical joint 142 moves in this axial relationship with optical joint 140, the resulting deflected light beam 162 will move in a linear path. It should further be understood that the joint 142 which is shown in dashed line in FIG. 3 and its associated components which are designated with similar primed reference numerals represent an alternative position of this optical joint.

The configuration and movement of the laser beam delivery optics and tubular members described above in conjunction with the Y axis of the manipulator are consistent with the movement of the manipulator along both the X axis and Z axis. Accordingly, a further appreciation of the laser beam delivery system in conjunction with both the X and Z axis will be had by review of the aforedescribed Y axis disposition.

Figure 5:
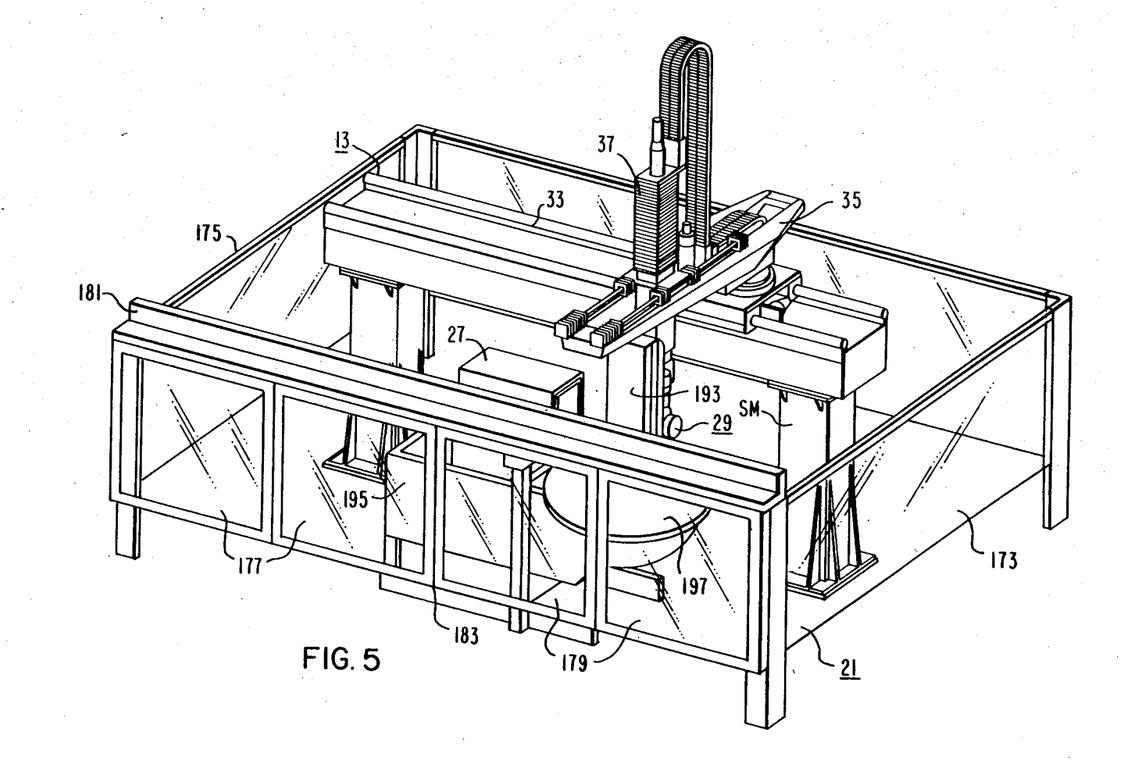
FIG. 5 is an isometric view of an orthogonal axis manipulator system incorporating the module wrist module of FIG. 4 in combination with a YAG laser unit.

The system described herein can be used with any of a variety of commercially available lasers. However, the actual construction of this system incorporated an Everlast EFA 51 $CO_2$ laser manufactured by Coherent Inc. The axial-flow laser has a power rating of 1250 watts. Various laser systems and types may be readily interfaced with the Series 6000 robot described herein. Since laser selection is highly application dependent, this interface flexibility assures that the proper manufacturing requirements are satisfied during the cell system configuration. A multiwatt $CO_2$ can be installed with the laser head mounted next to the robot manipulator and the beam path directed to a 3-axes programmed sequence of positions within the working envelope as shown in FIG. 1. Similarly, as shown in FIG. 5 and which will be described in detail below, a wave guide laser, bar code reader, a 400 watt YAG laser head or laser package of a similar size can be mounted on the vertical axis of the robot manipulator and moved in any 5-axis sequence to any location within the working envelope. The beam transmission hardware, i.e. laser beam delivery system 17 would thus be eliminated. However, it is to be appreciated that the application dependency of the selection of the laser used in conjunction with the robot manipulator would determine the proper laser selection.

As should be ready appreciated, all industrial type lasers require controlled water type coolant systems. While cooling can be affected through a variety of options it is preferred in the system described herein that because of the 15 gallon per minute temperature control requirements it has been determined that a recirculatory closed loop water cooling system provides a most cost affective and reliable option particularly over the long term. Such a recirculating cooling system is schematically represented at 25 in FIG. 1.

The system of FIG. 1 also provides an air filtration drying and regulating system at 20 shown in FIG. 1. A suitable system is commercially available in Balstron Filter Products, "Air Dryer Model 75". The reflective surfaces within the optical joints (i.e., optical joint 140 in FIG. 3) is a highly reflective material. Dust and condensation on these reflective surfaces has been identified as a potentially major problem in a laser beam delivery system such as described herein. The presence of dust and condensation within the laser beam delivery system 17 can cause beam blooming and will render the system inoperative. While several options are available for alleviating this problem, as will be readily appreciated, two of them offer both system interruption possibilities and on-going unnecessary expenses. It is possible, of course, to change the reflective material or periodically change the reflective members. To do so would require a system shutdown. It is also possible to purge the transmission tubes with dry nitrogen continuously as the system is operated. This system has obvious limitations and liabilities. It is preferred that a dry air filtration system be utilized because it is, over the long term, the most cost effective and efficient method for ensuring that the mirrors remain substantially free of dust and condensation during the system's operations and a desired environment is maintained within the delivery system. The previously identified commercially available filtration system also includes a bed of absorbent granules which remove such constituents as water vapor, carbon dioxide, sulfur hexafluoride, etc., which cause thermal beam blooming within the laser beam delivery system.

The exhaust system 19 shown in FIG. 1 includes a conduit system 19' which terminates proximate the laser beam delivery point 30 of the manipulator 13. It should be appreciated that do to the generic material processing nature of this system, some materials will emit toxic fumes during laser cutting and cladding processes. Accordingly, this exhaust system 19 provides a pickup nozzle disposed proximate the wrist and directed toward the source of the fumes. Means are provided in association with the pickup nozzle to generate the negative pressure necessary to draw the fumes from the work area for ultimate discharge and/or filtration. This system significantly reduces the toxic fumes in the work area.

Another key feture of the laser-robot system 11 is the safety enclosure generally indicated by the reference character 21 in FIG. 1. Characteristics and dangers of laser beams have prompted the need for a safety enclosure within which the work cell functions. It has been found that a plexiglass enclosure surrounding the working envelope provides a substantial margin of safety. The plexiglass enclosure, due to the characteristics of plexiglass will serve a multiplicity of purposes. For example, as plexiglass is hit by the laser when, for example, one is using a 10.6 micron $CO_2$ laser, smoke emits prior to burn-through and serves as an early warning signal to any individuals proximate the work cell. Additionally, plexiglass allows the operator to view the system operation with decreased risk of harm. Finally, the plexiglass can serve as a line of defense against unauthorized personnel entering the work envelope. The plexiglass can be provided with a series of stationary panels as at 173 supported by frame work members 175. A sliding door arrangement 177 and 179 supported by track member 181 can allow ease of entry and exit from the work cell by work personnel. Additionally, an innerlock system can be provided as at 183 which indicates to the robot controller that the sliding plexiglass doors are opened and that the laser operated functions should be terminated until an operator can investigate the interruption. It should further be appreciated that other type lasers might require different material than plexiglass for similar protection.

A robot control 27 is provided in the system for use in combination with the aforedescribed Series 6000 robot. The system is available with two control configurations, the Unimation VAL II and an optional CNC. The VAL II control uses a high level, highly structured computer language based upon intuitive English commands which are easy to learn, use and execute. The CNC control is programmed using standard machine tool programming language commands via an integral CRT and membrane keyboard. Post processors ara available to allow off-line or CAD programming in APT or APT-like languages. In addition to the usual teaching pendent programming, memory storage on paper tape, floppy disc, etc. is available. There are various alternative methods for facilitating the preparation or modification of the robot operating program. The forefront of advanced technology CAE/CAD/CAM is available. The interactive graphics of the CAD computer assists in all or part of the design, configuration, and program. A three dimensional product is displayed on the CRT and the laser motion as computer programmed is visually checked to verify that the program is functioning exactly as desired. This program is then post processed into robot machine language, transmitted by direct numerical control link to the robot computer and executed. Alternatively, a program can be manually written and post processed into the robot machine language. At higher levels of automation these characteristics and be effectively utilized to provide total FMS capability.

Figure 4:
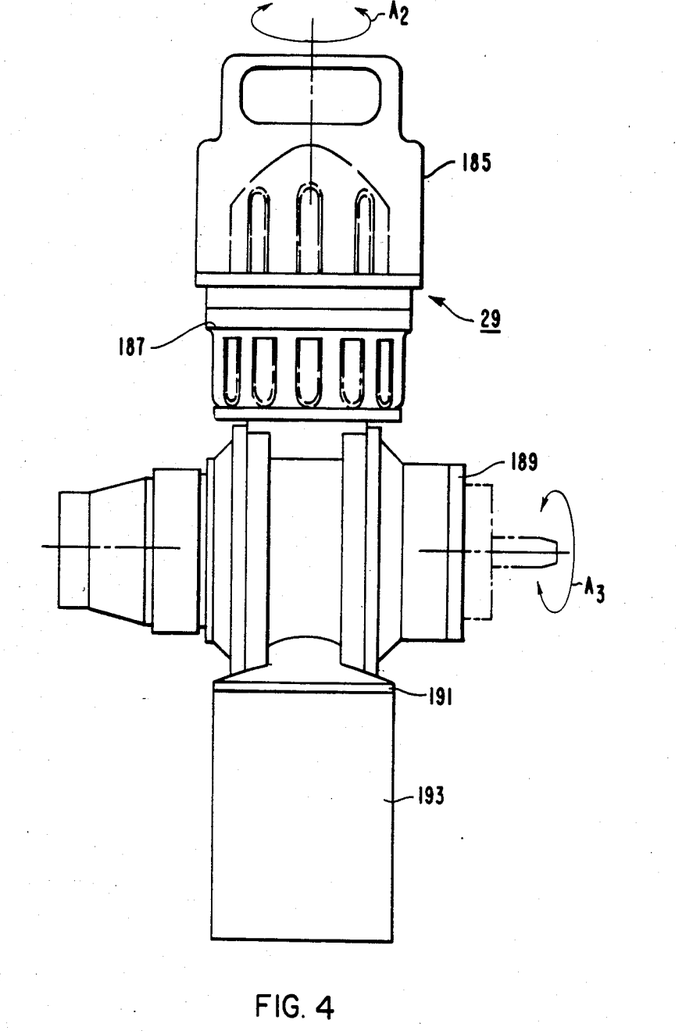
FIG. 4 is an elevational view of the module wrist and mounting bracket onto which a YAG laser can be mounted for use in the work cell of this invention.

Turning to FIGS. 4 and 5, an alternative arrangement using a YAG laser mounted onto the Z-axis arm of the manipulator 13 is shown. The YAG laser is shown for illustrative purposes only. It is to be appreciated that a bar code reader, wave guide laser or laser package of similar dimensions can be mounted on the wrist or Z axis arm of the manipulator. Additionally, this Figure shows a positioning table indicated at 119 which can be used in combination with the manipulator to provide an even increased degree of flexibility for the manufacturing cell.

There is described in U.S. patent application Ser. No. 605,405 which is entitled An Improved Robotic Wrist and which is assigned to the assignee of the present invention, a modular robotic wrist system for an industrial manipulator. This wrist is commercially available from Westinghouse Electric Corporation. The modular units comprise a mounting bracket 185, an A-axis module 187 providing rotational movement about a first axis $A_2$, a B-axis module 189 to provide either rotational movement which can be either independent or correlated with the first axis movement about a second axis, and tool mounting flanges 191 used with the B-axis module to provide rotational movement of an end effector about the second axis $A_3$. Each modulator unit has a rotating member driven by a high speed, low torque DC motor coupled to a harmonic drive unit and may have a position/speed feedback mechanism. This wrist as shown in FIGS. 4 and 5 permits enhanced movement of the YAG laser unit 193 mounted thereonto. The precision table 195 in FIG. 5 is but one example of a whole range of processed dependent peripheral devices which can be located in the working envelope Z of the manipulator 13. The table 195 has a turntable member 197 onto which a part can be removably secured for various metal processing applications. The table 199 shown in FIG. 1 consists of a black anodized aluminum plate and base 201. The purpose of the black anodizing is to absorb the laser beam should it break through to the table. The aluminum will serve as a heat sink to dissipate the laser energy as well as the working surface of the system. A two degree of freedom rotating-type fixture or table means can be provided for use in this cell.

What has been described is a robot-laser system in which a high powered laser can be effectively and efficiently coupled to an orthogonal axis manipulator to provide the heart of a manufacturing cell. Additionally, in combination with the robot and laser beam delivery system there has been described an air filtration and drying system, an exhaust system, a safety enclosure system for use in combination with this cell, precision tables and other fixturing, coolant chilling means and robot and control systems.

What is claimed is:

1. A robot laser work cell comprising in combination:
   a robotic system having one or more mechanical joints defining at least in part a first axis of motion and a second axis of motion, which axes of motion define a contour path through the robotic system's geometric range of motion, wherein each of said mechanical joints defines in part a frame member;
   an integral laser beam delivery system for the delivery of a beam along any point within said geometric range of motion, said integral laser beam delivery system including a plurality of optical joints and tubular members disposed between adjacent optical joints and through which tubular members the beam passes as it travels from optical joint to optical joint, wherein the optical joints of the laser beam delivery system have a housing with a reflective surface disposed therein mounted on the frame member of each mechanical joint of the robot so as to be in synchronous association with each mechanical joint and wherein the tubular members disposed between adjacent optical joints and through which tubular member the beam passes as it travels from optical joint to optical joint are expansible and collapsible with respect to each other and are rigidly attached between the frame member of each mechanical joint with which said adjacent optical joints are in synchronous association, wherein said reflective surface establishes a constant geometric relation between the segment of the beam impinging on the reflective surface and the axis of motion associated with the mechanical joints whereby the optical joints along with the tubular members disposed therebetween and each axis of motion of the robot are synchronous and incapable of mutual interference;
   an air filtration and drying system in communication with said tubular members of the laser beam delivery system, said air filtration and air drying system rendering a preferred environment within the tubular members which is substantially free of dust and condensation during the system's operation; and
   a safety enclosure system substantially surrounding a work envelope defined by the geometric range of motion of the robot which safety enclosure functions both as a line of defense against unauthorized entrance into the work envelope and as an early warning system to individuals proximate the work cell should the safety enclosure be contacted by laser energy.

2. A robot laser work cell comprising in combination:
   a robotic system having one or more mechanical joints defining at least in part a first axis of motion and a second axis of motion, which axes of motion define a contour path through the robotic system's geometric range of motion, wherein each of said mechanical joints defines in part a frame member;
   an integral laser beam delivery system for the delivery of a beam along any point within said geometric range of motion, said integral laser beam delivery system including a plurality of optical joints and tubular members disposed between adjacent optical joints and through which tubular members the beam passes as it travels from optical joint to optical joint; and
   an air filtration and drying system in communication with said tubular members of the laser beam delivery system, said air filtration and air drying system rendering an environment within the tubular members which is substantially free of dust and condensation during the system's operation.

3. The robot laser work cell according to claim 1 wherein the laser is a 10.6 micron $CO_2$ laser.

4. The robot laser work cell according to claim 1 wherein the safety enclosure means includes work cell access means having interlock means which provide a signal indicating whether the work cell access means are opened or closed.

5. The robot laser work cell according to claim 4 wherein the safety enclosure means includes plexiglass panels.

6. The robot laser work cell according to claim 3 wherein the optical joints of the laser beam delivery system are in communication with a cooling water delivery system for effecting the temperature control thereof.

7. A robot laser work cell according to claim 1 including an exhaust system comprising duct means disposed proximate the Z-axis of said manipulator for drawing from the work area proximate thereto fumes generated by a laser metal processing procedure.

8. A robot laser work cell comprising in combination:
   a robotic system having one or more mechanical joints defining at least in part a first axis of motion and a second axis of motion, which axes of motion define a contour path through the robotic system's geometric range of motion, wherein each of said mechanical joints defines in part a frame member;
   a modular robotic wrist system operably associated with said robot;
   a laser package mounted onto said module robotic wrist of the robotic system;

an exhaust system comprising duct means disposed approximate said laser package for drawing from the work area approximate thereto fumes generated by a laser metal processing procedure; and a safety enclosure system substantially surrounding a work envelope defined by the geometric range of motion of the robot which safety enclosure functions both as a line of defense against unauthorized entrance into the work envelope and as an early warning system to individuals proximate the work cell should the safety enclosure be contacted by laser energy.

9. A robot laser work cell comprising in combination:

a robotic system having one or more mechanical joints defining at least in part a first axis of motion and a second axis of motion, which axes of motion define a contour path through the robotic system's geometric range of motion, wherein each of said mechanical joints defines in part a frame member;

an integral laser beam delivery system for the delivery of a beam along any point within said geometric range of motion, said integral laser beam delivery system including a plurality of optical joints and tubular members disposed between adjacent optical joints and through which tubular members the beam passes as it travels from optical joint to optical joint;

an air filtration and drying system in communication with said tubular members of the laser beam delivery system, said air filtration and air drying system rendering a preferred environment within the tubular members which is substantially free of dust and condensation during the system's operation;

a safety enclosure system substantially surrounding a work envelope defined by the geometric range of motion of the robot which safety enclosure functions both as a line of defense against unauthorized entrance into the work envelope and as an early warning system to individuals proximate the work cell should the safety enclosure be contacted by laser energy; and an exhaust system comprising duct means disposed proximate a termination point of the laser beam delivery system for drawing from a work area proximate thereto fumes generated by a laser metal processing procedure.

10. The robot laser work cell according to claim 8 including a precision table means disposed within the work envelope of the manipulator.

11. The robot laser work cell according to claim 8 including robot control means operatively associated with said robot.

12. The robot laser work cell combination of claim 9 wherein the optical joints of the laser beam delivery system have a housing with a reflective surface disposed therein mounted on the frame member of each mechanical joint of the robot so as to be in synchronous association with each mechanical joint and wherein the tubular members disposed between adjacent optical joints and through which tubular member the beam passes as it travels from optical joint to optical joint comprise tubular member which are expansible and collapsible with respect to each other and are attached between the frame member of each mechanical joint with which said adjacent optical joints are in synchronous association, wherein said reflective surface establishes a constant geometric relation between the segment of the beam impinging on the reflective surface and the axis of motion associated with the mechanical joints whereby the optical joints along with the tubular members disposed therebetween and each axis of motion of the robot are synchronous and incapable of mutual interference.

13. The robot laser work cell according to claim 9 wherein the laser is a 10.6 micron $CO_2$ laser.

14. The robot laser work cell according to claim 9 wherein the safety enclosure means includes work cell access having interlock means which provide a signal indicating whether the work cell access means are opened or closed.

15. The robot laser work cell according to claim 9 wherein the safety enclosure means includes plexiglass panels.

16. The robot laser work cell according to claim 9 wherein the optical joints of the laser beam delivery system are in communication with a cooling water delivery system for effecting the temperature control thereof.

17. A robot laser work cell according to claim 9 including an exhaust system comprising duct means disposed proximate said manipulator for drawing from the work area proximate thereto fumes generated by a laser metal processing procedure.

18. The robot laser work cell according to claim 9 including a precision table means disposed within the work envelope of the manipulator.

19. The robot laser work cell according to claim 9 including robot control means operatively associated with said robot.

* * * * *